March 15, 1938.  R. ERICKSON  2,110,989
HANDLE BAR SECONDARY CONTROL DEVICE
Filed Feb. 8, 1937
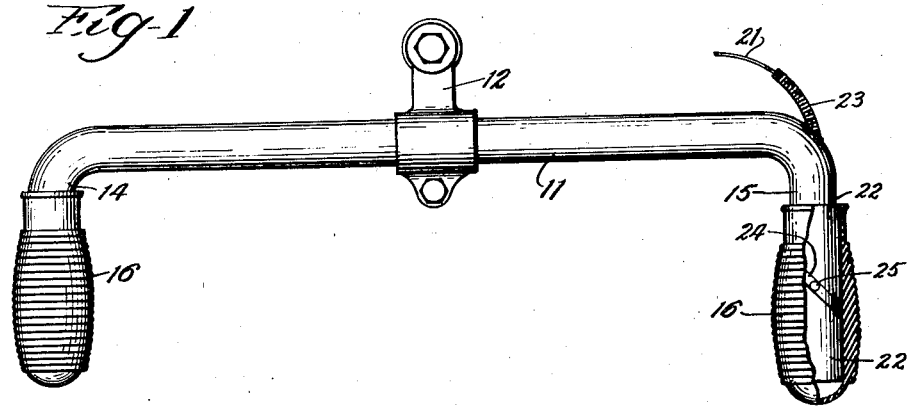
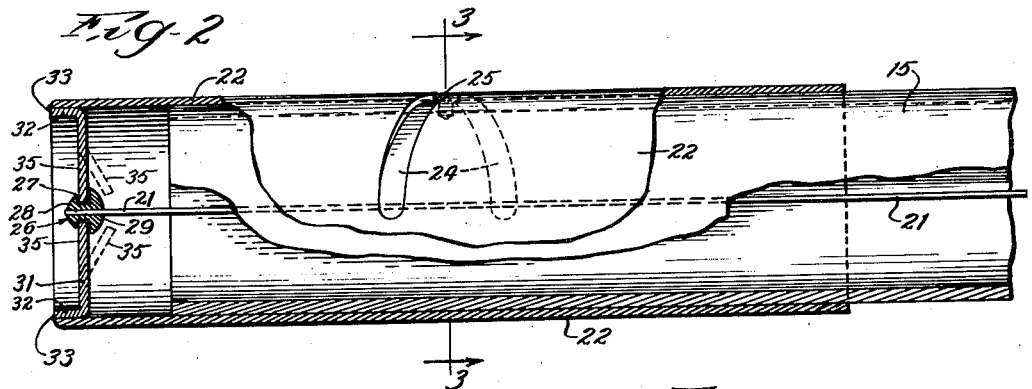
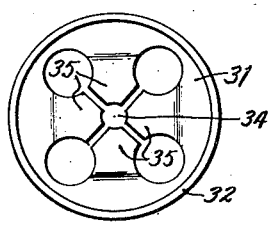
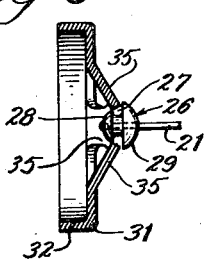
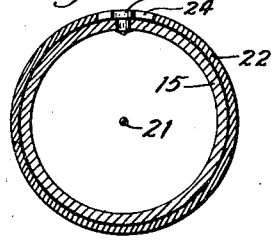
Inventor.
Roy Erickson.
By: Raymond D. Schnoor.
Atty.

Patented Mar. 15, 1938

2,110,989

UNITED STATES PATENT OFFICE 2,110,989

HANDLE BAR SECONDARY CONTROL DEVICE

Roy Erickson, Chicago, Ill., assignor of one-half to Edwin F. Jago and one-half to Robert G. Jago, both of Chicago, Ill.

Application February 8, 1937, Serial No. 124,581

6 Claims. (Cl. 74—489)

This invention relates in general to a handle bar secondary control device and more particularly to a control device or attachment for handle bars, such as are now in common use for controlling the directional movement of cycles and the like, whereby attachments, such as motor feed and ignition devices and alarms or similar devices which may be mounted on or attached to the cycles, may be controlled during operation thereof.

The objects of the invention which include the simplicity and economy of construction and the efficiency of operation will be apparent from the following description, which, taken in connection with the accompanying drawing, disclose a preferred embodiment thereof.

Referring to the drawing:

Fig. 1 is a plan view of a commercial type handle bar having only one secondary control device embodying my invention attached thereto and partly broken away to illustrate details of construction.

Fig. 2 is an enlarged elevational view illustrating an end or handle portion of a handle bar with a device embodying my invention attached thereto as in Fig. 1 and being broken away in part to illustrate details of construction.

Fig. 3 is a transverse section taken substantially on line 3—3, in Fig. 2, showing the cross-sectional form of the handle bar and the secondary control sleeve.

Fig. 4 is a detail view illustrating the details of a preferred form of end closure, and;

Fig. 5 is a sectional view of the end closure shown in Figs. 2 and 4, as formed and before the attachment thereof to the flexible element.

To illustrate my invention I have shown a commercial type handle bar 11 formed of tubular metal and mounted in a clamp bracket 12 by means of which the handle bar may be attached to a fork or steering post of a cycle for controlling directional movement thereof. The ends 14 and 15 of the handle bar 11 are bent substantially at right angles for manual engagement and to receive handle grips 16 of rubber or a similar material.

Control of the directional movement of a cycle or a like mechanism to which the handle bar 11 is attached is effected by manually engaging either one or both of the ends 14 and 15 of the handle bar and to provide a secondary control device which may be coincidentally actuated I have shown a flexible element 21 and a manually adjustable body or sleeve 22 adapted to be guided by the handle bar and connected to the flexible element 21.

The flexible element 21 illustrated is a relatively stiff but flexible wire extended through a portion of the handle bar 11 for connection to the sleeve 22 and from the handle bar through a suitable flexible shield 23 for connection to apparatus to be controlled thereby such as by axial adjustment thereof.

The body or sleeve 22 may be any suitable body which is constructed and arranged for movement parallel to the axis of a portion of the handle bar 11 and in the present embodiment I have shown a tubular metallic sleeve which is positioned over the end 15 of the handle bar 11. The length of the sleeve 22 is substantially equal to the normal length of the handle grips 16 and the internal diameter is slightly greater than the external diameter of the end 15 of the handle bar 11 so that the sleeve may be freely rotated and shifted axially with respect thereto.

Means is provided for effecting relative coaxial movement of the sleeve 22 and the end 15 of the handle bar in accordance with relative rotary adjustment thereof and to accomplish this economically a spiral slot 24 is formed in the sleeve 22 by cutting a straight slot therein at an angle to the axis thereof as illustrated and a shoulder pin 25 of a slightly smaller diameter than the width of the slot 24 is driven through the slot into a tight opening in the handle bar end 15 as illustrated Figs. 2 and 3.

While the flexible element 21 may be connected for axial movement with the sleeve 22 in any suitable manner I have shown a particularly efficient and economical means for connecting these elements. This means includes a small metal button 26, having an annular groove 27 formed therein between end heads 28 and 29, which may be suitably secured to the flexible element 21 by welding and a cap or end closure 31 which may be cup shaped and pressed into the sleeve 22 as illustrated. An annular flanged portion 32 of the closure 31 may be tack welded to the sleeve 22 as indicated at 33, Fig. 2.

The central portion of the closure 31 is punched out to form a central opening 34 and a series of prongs 35 and to facilitate assembly the prongs 35 are primarily offset as shown in Fig. 5 so that the opening 34 will be of sufficient size to receive the head 28 of the button 26 and so that when the head 28 is introduced through the opening 34 and pressure is applied to the large head 29 and the prongs 35 to move the prongs into a common plane, the prongs 35 will be freely engaged in the annular groove 27 as illustrated Fig. 2 to form a swivel connection between the flexible element 21 and the sleeve 22.

It will be noted that, when a device embodying my invention is attached to a handle bar as above described, an attachment controlled thereby may be readily adjusted without interference with steering, that adjustment of any attachment is not effected by steering action, that the adjustment thereof is not effected by road shocks or vibrations and that axial movement of the flexible element is positive in both directions.

It is thought that the invention and many of its attendant advantages will be understood from the foregoing description, and it will be apparent that various changes may be made in the form, construction, and arrangement of the parts without departing from the spirit and scope of the invention, or sacrificing all of its material advantages, the form hereinbefore described being merely a preferred embodiment thereof.

I claim:

1. The combination with a handle bar for controlling directional movement of cycles and the like, of a secondary control device carried thereby whereby attachments may be controlled, said secondary control device comprising a flexible element extending from the handle bar for connection to an attachment to be controlled by axial movement thereof, and a manually rotatable element guided by the handle bar and having a spiral slot formed therein for receiving a guide pin mounted in the handle bar and cooperating therewith to effect relative axial movement as an incident to relative rotary movement of said manually rotatable element with respect to said handle bar, said rotatable element being connected to said flexible element to effect axial movement thereof as an incident to rotary movement of said manually rotatable element.

2. The combination with a handle bar for controlling directional movement of cycles and the like, of a secondary control device carried thereby whereby attachements may be controlled, said secondary control device comprising, a flexible element extending from the handle bar for connection to an attachment to be controlled by axial movement thereof, a manually rotatable element guided by the handle bar and having a slot formed therein disposed at an angle to the axis thereof and being adapted to receive a guide pin mounted in the handle bar for cooperating therewith to effect axial movement as an incident to relative rotary movement, said rotatable element having a swivel connection with said flexible element to effect axial movement thereof without twisting and as an incident to rotary movement of said manually rotatable element.

3. The combination with a handle bar for controlling directional movement of cycles and the like, of a secondary control device carried thereby whereby attachments may be controlled, said secondary control device comprising, a flexible element extending from the handle bar for connection to an attachment to be controlled by axial movment thereof, and a manually rotatable element having a pin and spiral slot connection with the handle bar whereby relative axial movement thereof is effected as an incident to rotary movement of said rotatable element and being guided thereby, said rotatable element being connected to said flexible element whereby said flexible element may be axially adjusted.

4. The combination with a handle bar for controlling directional movement of cycles and the like, of a secondary control device carried thereby whereby attachments may be controlled, said secondary control device comprising, a flexible element extending from the handle bar for connection to an attachment to be controlled by axial movement thereof, a sleeve mounted on an end of said handle bar for relative axial movement with respect thereto having a spiral slot formed therein and being connected to said flexible element, and a guide pin mounted in said handle bar and engaging in the slot in said sleeve, whereby axial movement of said flexible element is effected by rotary movement of said sleeve.

5. The combination with a handle bar for controlling directional movement of cycles and the like, of a secondary control device carried thereby whereby attachments may be controlled, said secondary control device comprising, a flexible element extending from the handle bar for connection to an attachment to be controlled by axial movement thereof, a sleeve adapted to fit freely over said handle bar and having a slot cut therein intermediate the ends thereof and at an angle to the axis thereof, a pin mounted in said handle bar adjacent an end thereof and engaging in the slot in said sleeve whereby axial movement of said sleeve may be effected by rotary movement thereof, and means connecting said flexible element for axial movement with said sleeve.

6. The combination with a handle bar for controlling directional movement of cycles and the like, of a secondary control device carried thereby whereby attachments may be controlled, said secondary control device comprising, a flexible element extending from the handle bar for connection to an attachment to be controlled by axial movement thereof, a sleeve adapted to fit freely over said handle bar and having a slot cut therein intermediate the ends thereof and at an angle to the axis thereof, a pin mounted in said handle bar adjacent an end thereof and engaging in the slot in said sleeve whereby axial movement of said sleeve may be effected by rotary movement thereof, and means connecting said flexible element for axial movement with said sleeve, said means comprising a button attached to the flexible element and having an annular groove therein, and an end closure device mounted in an end of said sleeve and engaging in the annular groove in said button.

ROY ERICKSON.